2,987,452
METHOD FOR THE PURIFICATION OF HEXAMETHYLENEDIAMINE

Charles R. Campbell, Richard D. Chapman and Robert Johnson, Pensacola, Fla., assignors to The Chemstrand Corporation, Decatur, Ala., a corporation of Delaware
No Drawing. Filed June 26, 1959, Ser. No. 823,023
6 Claims. (Cl. 202—57)

This application relates to the production of hexamethylenediamine and more particularly to a method for the refinement of hexamethylenediamine to a highly purified state.

Although there are a number of methods for the preparation of hexamethylenediamine which are known and used in industry, none of these methods results in the production of hexamethylenediamine which is free of products of side reactions and the like. Consequently, further refinement of hexamethylenediamine is generally necessary to obtain a product which exhibits the high state of purity necessary if the hexamethylenediamine is to be employed as an intermediate in other industrial processes which culminate in the production of commercially sealable articles. This is especially true, for example, in the production of polyamides wherein hexamethylenediamine is reacted with adipic acid to produce polyhexamethyleneadipamide which is used in many end products.

Utilization of poorly refined hexamethylenediamine in the production of polyhexamethyleneadipamide causes a restriction of molecular weight, results in a polymer having bad color characteristics and poor dyeability, and affects other physical and chemical properties thereof. For example, in the textile field where polyhexamethyleneadipamide is widely used in the production of filaments and fibers, the use of poorly refined hexamethylenediamine results in weak filaments and fibers. Furthermore, rigid color specifications must be maintained in the textile field in order to obtain products which can meet stringent standards with respect to dyeability and the like. Accordingly, polyhexamethyleneadipamide having good color characteristics is necessary. It is quite obvious, therefore, that only highly pure hexamethylenediamine meets the necessary requirements for the production of end products which are acceptable.

As a consequence of the need for highly purified hexamethylenediamine, methods of refinement are now used throughout industry regardless of the particular method employed in the production of hexamethylenediamine.

However, although the current methods employed to refine hexamethylenediamine result in a commercially acceptable product, the problem of impurities therein still remains a cause for concern since the quality and properties of end products in which hexamethylenediamine is used as an intermediate can still be further improved by minimizing even more the impurities present in refined hexamethylenediamine.

One method for the production of hexamethylenediamine currently in wide use throughout industry is the hydrogenation of adiponitrile in the presence of a catalyst, such as cobalt. This method is carried out continuously by passing hydrogen and adiponitrile over a catalyst under pressure and at an elevated temperature. Since the reaction is exothermic, liquid ammonia is employed to absorb the heat by vaporization and also to limit to a considerable extent the formation of by-products. When the crude product is formed, it contains impurities which are removed by passing it through a refining train composed of a series of distillation stills. It has now been found, however, that even after passing through the refining train the hexamethylenediamine still contains impurities which are undesirable. It is believed that these impurities are formed both in the hexamethylenediamine production system and in the refining train.

The exact nature of these impurities is unknown. However, extensive investigation has led to the conclusion that principally they are aminohexylideneimine and the condensation products of this imine with itself and with hexamethylenediamine and other types of compounds. These impurities may generally be called polarographically reducible impurities since they give rise to unsaturated bonds reduced by the polarograph and will be so designated hereinafter in this specification and in the claims. The following diagrammatic equations show the reversible reactions of these types of compounds in hexamethylenediamine.

REVERSIBLE REACTIONS OF POLAROGRAPHICALLY REDUCIBLE COMPOUNDS IN HEXAMETHYLENEDIAMINE

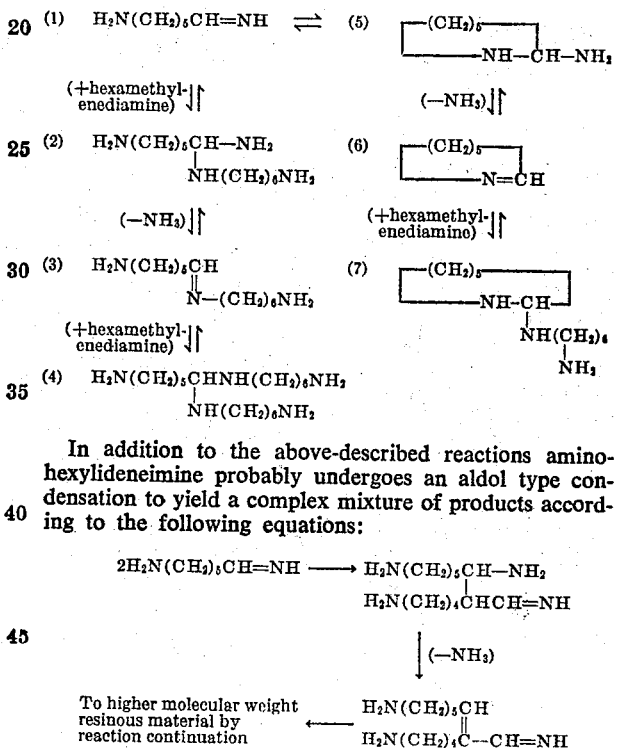

In addition to the above-described reactions aminohexylideneimine probably undergoes an aldol type condensation to yield a complex mixture of products according to the following equations:

$$2H_2N(CH_2)_5CH=NH \longrightarrow \begin{array}{l} H_2N(CH_2)_5CH-NH_2 \\ \quad | \\ H_2N(CH_2)_4CHCH=NH \end{array}$$

$$\downarrow (-NH_3)$$

$$\begin{array}{l} \text{To higher molecular weight} \\ \text{resinous material by} \\ \text{reaction continuation} \end{array} \longleftarrow \begin{array}{l} H_2N(CH_2)_5CH \\ \quad \| \\ H_2N(CH_2)_4C-CH=NH \end{array}$$

It is readily apparent that these compounds give rise to unsaturated bonds and are polarographically reducible. All are reduced by the polarograph at potentials of 1.3 to 1.5 volts. A distinct need exists in industrial processes for a method of purifying refined hexamethylene-diamine to a state wherein such impurities are entirely removed or at the most reduced to negligible amounts.

Accordingly, it is a primary object of this invention to provide a method for the preparation of highly purified hexamethylenediamine. It is another object of this invention to provide a method for controlling polarographically reductible impurities in hexamethylenediamine. It is still a further object of the invention to eliminate low-boiling polarographically reducible impurities from refined hexamethylenediamine. It is still a further object of the invention to provide a method conducive to the conversion of low-boiling polarographically reducible impurities to high-boiling polarographically reducible impurities in hexamethylenediamine. Other objects and advantages of this invention will be apparent from reading the following description.

In general, the above objects are accomplished by distilling hexamethylenediamine in the presence of potassium hydroxide.

When utilizing potassium hydroxide to remove polarographically reducible impurities, the potassium hydroxide can be employed in solid form. However, due to the difficulty of introducing solid potassium hydroxide directly into a distillation column in a convenient manner, it is preferred that aqueous solutions of potassium hydroxide be added to the column. Since potassium hydroxide is only slightly soluble in hot hexamethylenediamine the concentration cannot be allowed to exceed certain limits since caustic precipitation on the heat transfer surface in the column will cause inefficient operation thereof. Accordingly, potassium hydroxide is employed in an amount from about 0.01 percent to about 1 percent, based on the total weight of hexamethylenediamine in the distillation column feed. However, it is preferred that the potassium hydroxide be employed in a range of 0.5 percent to 0.1 percent, based on the total weight of hexamethylenediamine in the column feed. The amount of water used as a vehicle for introducing the potassium hydroxide can vary within very wide limits and is restricted only from a parctical viewpoint since the conditions in the column are such that the water immediately evaporates and is removed in the column make stream. Where a continuous distillation is being carried out, it is readily apparent that the addition of potassium hydroxide in aqueous solution greatly facilitates better control in adding it to the distillation column.

In order for potassium hydroxide to be effective in removing polarographically reducible impurities in the practice of the instant invention, it is necessary that the process be carried out within certain temperature and pressure ranges. Generally speaking, potassium hydroxide is effective within the broad ranges which are employed to distill hexamethylenediamine. Accordingly, in order to remove polarographically reducible impurities with potassium hydroxide by the process of the instant invention, a temperature within a range of 85° C. to 200° C. and pressures in a range of 10 mm. of mercury to atmospheric pressure (760 mm. of mercury) are employed. However, as a practical matter, for most efficient operation of a distillation column suitable for hexamethylenediamine fractionation, temperatures within a range of 112° C. to 120° C. and pressures of from 40 to 50 mm. of mercury are preferred.

The polarographically reducible compounds present in crude hexamethylenediamine are cyclic and non-cyclic compounds which may or may not be Schiff's bases as illustrated in the equations above. Reaction equilibrium tends to favor the non-cyclic state. Generally, the high molecular weight compounds have a distillation temperature higher than hexamethylenediamine and during reaction are separated therefrom by distilling the hexamethylenediamine over in the heads of the refining column and leaving the high molecular weight compound impurities as tails. The lower molecular weight polarographically reducible impurities, however, distill over with the hexamethylenediamine and contaminate the final product. Furthermore, the concentrating of the high-boiling polarographically reducible compounds in the base of the refining column leads to increased generation of low-boiling polarographically reducible compounds in the refined hexamethylenediamine.

An advantage of the equilibrium illustrated in the equations above is utilized in the practice of the present invention to remove low-boiling polarographically reducible impurities by adding potassium hydroxide to the refining column to induce the conversion of low-boiling polarographically reducible impurities to high-boiling polarographically reducible impurities. Although it is not known exactly how the potassium hydroxide reacts in the column, it is believed that under the conditions of temperature, pressure and the like that exist in the column, the potassium hydroxide catalyzes the formation of high-boiling polarographically reducible impurities. Regardless of whether this is true or not, the potassium hydroxide performs extremely well in removing polarographically reducible impurities from refined hexamethylenediamine while at the same time having no serious adverse effects on the refined product.

One particularly useful distillation system for carrying out the purification of hexamethylenediamine and into which the present invention can be incorporated may be described as follows: Crude hexamethylenediamine containing 1,2-diaminocyclohexane, hexamethyleneimine, water, and ammonia is introduced into a packed column operated at about atmospheric pressure. This generally serves to remove ammonia and most of the water as well as hexamethyleneimine which forms a low-boiling azeotrope with water. The tails from this column which still contain a small amount of water are carried to an intermediates column which is connected in series to a purge column. The intermediates column is operated under a vacuum at an absolute pressure of about 50 to 400 mm. Most of the 1,2-diaminocyclohexane as well as any pentamethylenediamine that may be present, some of the water, and some of the hexamethylenediamine is taken over in the heads from the intermediates column to the purge column. The tails from the intermediates column which contain more purified hexamethylenediamine are passed to a refining column. The heads from the intermediates column which have been led to the purge column are concentrated therein and then returned to the intermediates column. 1,2-diaminocyclohexane is purged in the make stream of the purge column. If desired, the recovered hexamethylenediamine can be recycled to the foreshots column when it is not sufficiently pure. Usually, however, the hexamethylenediamine in the tails of the purge column is returned to the intermediate column.

Accordingly, the refining column operates on the tails from the intermediates column. In the refining column the hexamethylenediamine has the high-boiling impurities removed therefrom as tails. Among such impurities are the half-hydrogenation product, epsilon-aminocapronitrile, and most of the high-boiling polarographically reducible impurities. The low-boiling polarographically reducible impurities, however, distill over with the hexamethylenediamine. Therefore, in order to insure practically complete removal of the low-boiling impurities, it is necessary to add the potassium hydroxide in the refining system at that point where such impurities are present in their highest concentration. This point occurs as the hexamethylenediamine is distilled in the refining column, although generally, it can be added to any column of the refining train. Since this process is a continuous one, part of the refined hexamethylenediamine may be led to storage tanks from a condenser and part may be returned directly from the condenser to the top of the column as reflux.

The following examples are intended to illustrate the present invention more fully but are not to be construed as limiting the scope thereof, for it is possible to effect many modifications therein.

EXAMPLE I

A series of batch distillations on portions of a sample of hexamethylenediamine were made in the laboratory distillation column and wherein a head temperature of about 113° C. and a pressure of about 42 mm. of mercury was maintained. The initial distillation contained polarographically reducible impurities and was used as a control. The second distillation was made in the presence of potassium hydroxide which was introduced into the column along with the hexamethylenediamine. The results of each run are given in the table below.

Table I

|  | Control | Distillation in presence of KOH |
|---|---|---|
| Percent caustic in charge (based on the total weight of hexamethylenediamine) | 0 | 1 |
| Polarographically reducible impurities in charge (mols per million mols) | 35,000 | 37,500 |
| Polarographically reducible impurities in the 80% make fraction (mols per million mols) | 1,300 | 114 |
| Polarographically reducible impurities in the 20% tails fraction (mols per million mols) | 162,000 | 164,000 |

These data show that the presence of 1 percent potassium hydroxide is very effective in reducing the amount of polarographically reducible impurities in hexamethylene diamine. The polarographically reducible impurity calculations were made on a dropping mercury electropolarograph at 1.3 to 1.5 volts which had been calibrated with heptaldehyde, 1 mol of which is equivalent to 1 mol of polarographically reducible impurity.

EXAMPLE II

A continuous distillation was made on a laboratory Oldershaw column in which potassium hydroxide was added to observe the effect on polarographically reducible impurities. The head temperature of the distillation column was maintained at about 113° C. and a pressure of about 42 mm. of mercury. The hexamethylenediamine charged to the distillation column had a polarographically reducible impurity level of 1,655 mols per million mols of hexamethylenediamine. The following table illustrates the effectiveness of various amounts of aqueous potassium hydroxide capable of reducing the polarographically reducible impurities concentration in the refined product to low levels. Samples were taken at intervals of 1 hour each.

Table II
EFFECT OF KOH ADDITION IN CONTINUOUS DISTILLATION

| Sample No. | KOH in Feed, Percent | Refined Hexamethylenediamine Analysis of PRI (mols per million mols) |
|---|---|---|
| 1 | 0.00 | 275 |
| 2 | 0.00 | 241 |
| 3 | 0.00 | 248 |
| 4 | 0.00 | 233 |
| 5 | 0.00 | 288 |
| 6 | 0.00 | 241 |
| 7 | .01 | 238 |
| 8 | .01 | 243 |
| 9 | .01 | 230 |
| 10 | .01 | 233 |
| 11 | .01 | 262 |
| 12 | .01 | 233 |
| 13 | .01 | 228 |
| 14 | .05 | 51 |
| 15 | .05 | 20 |
| 16 | .05 | 30 |
| 17 | .05 | 18 |
| 18 | .05 | 22 |
| 19 | .05 | 32 |
| 20 | .05 | 26 |
| 21 | .05 | 20 |
| 22 | .10 | 22 |
| 23 | .10 | 27 |
| 24 | .10 | 22 |

The above data readily establish that in a range of from about .05 to .10 percent KOH, the polarographically reducible impurities in hexamethylenediamine are effectively reduced to extremely low levels. The polarographically reducible impurities were calculated according to the method described in Example I.

EXAMPLE III

Two liters of refined hexamethylenediamine were refluxed for 20 hours at atmospheric pressure with and without the prior addition of 10 grams of potassium hydroxide. The results of the analyses of the starting material and the refluxed samples are given in Table III. The amount of impurities has been based on the number of mols per million mols of hexamethylenediamine where such methods of reference were applicable.

Table III
IMPURITIES IN REFINED HEXAMETHYLENEDIAMINE AFTER HEATING WITH 0.5 PERCENT KOH AT 204° C.

| Analysis | Starting Material | Control without KOH | Sample with KOH |
|---|---|---|---|
| Polarographically reducible impurities, mols per million mols | 170 | 85 | 408 |
| Assay, hexamethylenediamine, percent | 100.0 | 100.21 | 100.08 |
| Freezing point, ° C | 40.94 | 40.94 | 40.94 |

The above data show that hexamethylenediamine refluxed in the presence of potassium hydroxide over extended periods of time remained stable. The data further show that under refluxing conditions potassium hydroxide does not reduce polarographically reducible impurities in hexamethylenediamine.

EXAMPLE IV

For further comparison the refluxed material employed in Example III was distilled at 117° C. under a pressure of 50 mm. of mercury at a 1 to 1 reflux ratio. An 80 percent cut was obtained and submitted for analysis. Results of that analysis are given in the following table. The amount of impurities has been based on the number of mols per million mols of hexamethylenediamine where such methods of reference were applicable.

Table IV
IMPURITIES IN REDISTILLED HEXAMETHYLENEDIAMINE FOLLOWING TREATMENT WITH KOH

| Make Analysis | Control from hexamethylenediamine without KOH | Sample from hexamethylenediamine with KOH |
|---|---|---|
| Polarographically reducible impurities, mols per million mols | 55 | 19 |
| Assay; hexamethylenediamine, percent | 100.03 | 99.91 |
| Freezing point, ° C | 40.94 | 40.84 |

These results indicate the hexamethylenediamine does not suffer any deleterious effects from contact with potassium hydroxide.

The present invention presents many advantages over presently employed methods of hexamethylenediamine refinement. It results in the preparation of hexamethylenediamine having greatly improved purity by reducing polarographically reducible impurities to negligible amounts. Furthermore, no great procedural changes in the preparation of hexamethylenediamine are necessary since the potassium hydroxide may be introduced into the distillation column by the mere addition of a line through which the potassium hydroxide may pass into the distillation column. The highly purified hexamethylenediamine prepared in accordance with the process of the instant invention obviates quality problems encountered in industry where hexamethylenediamine is employed in producing commercial items, such as polyhexamethyleneadipamide and the like. Numerous other advantages of this invention will be apparent to those skilled in the art from reading the instant description.

As many apparently widely different embodiments of this invention may be made without departing from the spirit and scope thereof, it is to be understood that the same is not to be limited to the specific embodiments thereof, except as defined in the appended claims.

We claim:

1. A process for removing polarographically reducible impurities from hexamethylenediamine comprising feeding hexamethylenediamine containing a high concentration of low-boiling polarographically reducible impurities to a distillation column, adding 0.01 to 1.0 percent, based on the total weight of hexamethylenediamine in the column feed, of potassium hydroxide to the distillation column, subjecting the resulting mixture to a temperature in a range of 85° C. to 200° C. and a pressure in a range of 10 mm. of mercury to atmospheric pressure to convert said low-boiling polarographically reducible impurities to high-boiling polarographically reducible impurities, and collecting said high-boiling polarographically reducible impurities as residue while recovering hexamethylenediamine as purified distillate.

2. A process for removing polarographically reducible impurities from hexamethylenediamine comprising feeding hexamethylenediamine containing a high concentration of low-boiling polarographically reducible impurities to a distillation column, adding 0.05 to 0.1 percent, based on the total weight of hexamethylenediamine in the column feed, of potassium hydroxide to the distillation column, subjecting the resulting mixture to a temperature in a range of 112° C. to 120° C. and a pressure of 40 to 50 mm. of mercury to convert said low-boiling polarographically reducible impurities to high-boiling polarographically reducible impurities, and collecting said high-boiling polarographically reducible impurities as residue while recovering hexamethylenediamine as purified distillate.

3. The process as defined in claim 2 wherein the potassium hydroxide is in aqueous solution.

4. A continuous process for removing polarographically reducible impurities from hexamethylenediamine comprising continuously feeding hexamethylenediamine containing a high concentration of low-boiling polarographically reducible impurities to a distillation column, continuously adding 0.01 to 1.0 percent, based on the total weight of hexamethylenediamine in the column feed, of aqueous potassium hydroxide to said column, continuously subjecting the resulting mixture to a temperature in a range of 85° C. to 200° C. and a pressure in a range of 10 mm. of mercury to atmospheric pressure to convert continuously said low-boiling polarographically reducible impurities to high-boiling polarographically reducible impurities, and collecting said high-boiling polarographically reducible impurities as residue while continuously recovering said hexamethylenediamine as purified distillate; the addition of said aqueous potassium hydroxide being regulated to maintain the percentage concentration thereof within the desired range with respect to said hexamethylenediamine in the column feed.

5. A continuous process for removing polarographically reducible impurities from hexamethylenediamine comprising continuously feeding hexamethylenediamine containing a high concentration of low-boiling polarographically reducible impurities to a distillation column, continuously adding 0.05 to 0.1 percent, based on the total weight of hexamethylenediamine in the column feed, of aqueous potassium hydroxide to said column, continuously subjecting the resulting mixture to a temperature of about 113° C. and a pressure of about 42 mm. of mercury to convert continuously said low-boiling polarographically reducible impurities to high-boiling polarographically reducible impurities, and collecting said high-boiling polarographically reducible impurities as residue while continuously recovering said hexamethylenediamine as purified distillate, the addition of said aqueous potassium hydroxide being regulated to maintain the percentage concentration thereof within the desired range with respect to said hexamethylenediamine in the column feed.

6. A continuous process for removing polarographically reducible impurities from hexamethylenediamine comprising feeding continuously hexamethylenediamine containing a high concentration of low-boiling polarographically reducible impurities to a distillation column, continuously adding 0.05 to 0.1 percent, based on the total weight of hexamethylenediamine in the column feed, of aqueous potassium hydroxide to said column, continuously subjecting the resulting mixture to a temperature of about 117° C. and a pressure of about 50 mm. of mercury to convert continuously said low-boiling polarographically reducible impurities to high-boiling polarographically reducible impurities, and collecting said high-boiling polarographically reducible impurities as residue while continuously recovering said hexamethylenediamine as purified distillate, the addition of said aqueous potassium hydroxide being regulated to maintain the percentage concentration thereof within the desired range with respect to said hexamethylenediamine in the column feed.

References Cited in the file of this patent
UNITED STATES PATENTS

| | | |
|---|---|---|
| 2,769,841 | Dylewski et al. | Nov. 6, 1956 |
| 2,802,030 | Ashby | Aug. 6, 1957 |

UNITED STATES PATENT OFFICE
CERTIFICATE OF CORRECTION

Patent No. 2,987,452  June 6, 1961

Charles R. Campbell et al.

It is hereby certified that error appears in the above numbered patent requiring correction and that the said Letters Patent should read as corrected below.

Column 1, line 24, for "sealable" read -- saleable --; column 3, line 20, for "0.5" read -- 0.05 --.

Signed and sealed this 14th day of November 1961.

(SEAL)
Attest:

ERNEST W. SWIDER
Attesting Officer

DAVID L. LADD
Commissioner of Patents
USCOMM-DC